US008429755B2

(12) United States Patent
Jogand-Coulomb et al.

(10) Patent No.: US 8,429,755 B2
(45) Date of Patent: Apr. 23, 2013

(54) SYSTEM AND METHOD FOR RECEIVING DIGITAL CONTENT

(75) Inventors: Fabrice Jogand-Coulomb, San Carlos, CA (US); Bahman Qawami, Los Altos, CA (US); Farshid Sabet-Sharghi, Los Altos, CA (US)

(73) Assignee: Sandisk Technologies Inc., Plano, TX (US)

( * ) Notice: Subject to any disclaimer, the term of this patent is extended or adjusted under 35 U.S.C. 154(b) by 1324 days.

(21) Appl. No.: 11/137,916

(22) Filed: May 26, 2005

(65) Prior Publication Data
US 2006/0272032 A1 Nov. 30, 2006

(51) Int. Cl.
*H04L 29/06* (2006.01)
*H04L 9/32* (2006.01)
*G06F 17/30* (2006.01)

(52) U.S. Cl.
USPC ............. 726/30; 713/155; 713/165; 713/167; 713/176; 726/2

(58) Field of Classification Search ........................ None
See application file for complete search history.

(56) References Cited

U.S. PATENT DOCUMENTS

| | | | |
|---|---|---|---|
| 6,330,670 B1 | 12/2001 | England et al. | |
| 6,385,596 B1 | 5/2002 | Wiser et al. | |
| 6,463,534 B1 | 10/2002 | Geiger et al. | |
| 6,587,837 B1 | 7/2003 | Spagna et al. | |
| 6,697,944 B1 | 2/2004 | Jones et al. | |
| 6,751,598 B1 | 6/2004 | Yagawa et al. | |
| 6,824,051 B2 | 11/2004 | Reddy et al. | |
| 7,139,372 B2 * | 11/2006 | Chakravorty et al. | ... 379/114.01 |
| 7,170,999 B1 | 1/2007 | Kessler et al. | |
| 7,395,426 B2 | 7/2008 | Lee et al. | |
| 7,546,641 B2 * | 6/2009 | Robert et al. | .................... 726/30 |
| 2002/0069117 A1 | 6/2002 | Carothers et al. | |

(Continued)

FOREIGN PATENT DOCUMENTS

| | | |
|---|---|---|
| CA | 2342314 A1 | 4/2000 |
| CA | 2342315 A1 | 10/2001 |

(Continued)

OTHER PUBLICATIONS

Borland, John, "Altnet to pay Kazaa users for swapping", http://news.com.com/Altnet+to+pay+Kazaa+users+for+swapping/2100-1025_3-1011827.html, (Jun. 1, 2003), 1-6.

(Continued)

*Primary Examiner* — Philip Chea
*Assistant Examiner* — Fatoumata Traore
(74) *Attorney, Agent, or Firm* — Toler Law Group, PC

(57) ABSTRACT

A method and system for conducting a transaction involving digital content is provided. The system includes, a first user of a first mobile device connected to a network; a second user of a second mobile device connected to the network; a MNO that is functionally coupled to the first mobile device and the second mobile device and to a digital content provider and a rights issuing authority. The MNO receives a request for digital content from the first user, searches for the requested digital content and if the second user has the requested digital content, then the MNO obtains any rights to re-distribute/access the requested digital content; and the second user, the digital content provider and the MNO are compensated for distributing the requested digital content from the second mobile device to the first mobile device.

12 Claims, 7 Drawing Sheets

U.S. PATENT DOCUMENTS

| | | |
|---|---|---|
| 2002/0087887 A1 | 7/2002 | Busam et al. |
| 2002/0094787 A1 | 7/2002 | Avnet et al. |
| 2002/0111902 A1 | 8/2002 | Satou et al. |
| 2002/0138291 A1 | 9/2002 | Vaidyanathan et al. |
| 2002/0138440 A1 | 9/2002 | Vaidyanathan et al. |
| 2002/0157002 A1 | 10/2002 | Messerges et al. |
| 2003/0023505 A1 | 1/2003 | Eglen et al. |
| 2003/0125964 A1 | 7/2003 | Chang et al. |
| 2003/0158958 A1* | 8/2003 | Chiu .......................... 709/231 |
| 2003/0217006 A1 | 11/2003 | Roever et al. |
| 2004/0003139 A1* | 1/2004 | Cottrille et al. ............. 709/331 |
| 2004/0030651 A1* | 2/2004 | Kim et al. .................... 705/51 |
| 2004/0103295 A1 | 5/2004 | Gustafsson |
| 2004/0148523 A1 | 7/2004 | Lambert |
| 2004/0172365 A1 | 9/2004 | Murakami et al. |
| 2004/0176080 A1 | 9/2004 | Chakravorty et al. |
| 2004/0177042 A1 | 9/2004 | Fostick |
| 2004/0181487 A1 | 9/2004 | Hanson |
| 2004/0181490 A1 | 9/2004 | Gordon et al. |
| 2004/0193545 A1 | 9/2004 | Shlasky |
| 2004/0193550 A1 | 9/2004 | Siegel |
| 2004/0205028 A1 | 10/2004 | Verosub et al. |
| 2004/0205333 A1 | 10/2004 | Bjorkengren |
| 2004/0220995 A1 | 11/2004 | Tsutsumi |
| 2005/0119975 A1 | 6/2005 | O'Donnell |
| 2006/0080112 A1 | 4/2006 | Fontijn et al. |

FOREIGN PATENT DOCUMENTS

| | | |
|---|---|---|
| CN | 1474332 A | 2/2004 |
| EP | 1458165 A2 | 9/2004 |
| TW | 469714 | 12/2001 |
| TW | 229531 B | 3/2005 |
| TW | 1229531 | 3/2005 |
| TW | 231681 B | 4/2005 |
| TW | 1231681 | 4/2005 |
| TW | 550909 | 9/2008 |
| WO | 01/59653 A1 | 8/2001 |

OTHER PUBLICATIONS

Kumar, Praveen, et al., "DMW—A Middleware for Digital Rights Management in Peer-to-Peer Networks", *Proceedings. Sixteenth International Workshop on Database and Expert Systems Applications IEEE Comput. Soc* Los Alamitos, [Online], XP002403940, ISBN: 0-7695-2424-9, (Aug. 22, 2005),246-250.

Nair, Srijith K., et al., "Enabling DRM-preserving Digital Content Redistribution", *Seventh IEEE International Conference on E-Commerce Technology IEEE (Comp. Soc)* Los Alamitos, XP002403941, ISBN: 0-7695-2277-7,(2005),151-158.

Reti, Tommo, et al., "Broadcasting Commercial Data on Mobile Peer-to-Peer Networks", *Tokyo Roundtable 2002 Proceedings*, [Online] 2002, XP002403939, (2002).

International Search Report on corresponding PCT application (PCT/US2006/019968) from International Searching Authority (EPO) dated Nov. 8, 2006.

Written Opinion on corresponding PCT application (PCT/US2006/019968) from International Searching Authority (EPO) dated Nov. 8, 2006.

Taiwanese Search Report; Taiwan Application No. 095116962, Report dated Mar. 30, 2009, 2 pages.

Communication pursuant to Article 94(3) EPC for EP Application No. 06770988.1 mailed May 5, 2008, 3 pages.

Final Office Action mailed Mar. 23, 2012 in U.S. Appl. No. 12/726,955, 22 pages.

Non-Final Office Action mailed Nov. 9, 2011 in U.S. Appl. No. 12/726,955, 17 pages.

Advisory Action mailed Jul. 5, 2012 in U.S. Appl. No. 12/726,955, 3 pages.

* cited by examiner

SYSTEM AND METHOD FOR RECEIVING DIGITAL CONTENT

BACKGROUND OF THE INVENTION

1. Field of the Invention

The present invention relates to a method and system for digital content distribution/transactions, and more particularly to generating revenue based on distributing digital content stored in a subscriber's mobile device and when the subscriber's mobile device is connected to a network.

2. Background

Rapid improvements in digital technology have changed the way information is shared and distributed. From newspapers to photographs, users in every aspect of today's modern life use digital content. The popularity of the Internet and the use of mobile devices (for example, cellular phones, personal digital assistants and other devices), have further increased the demand for digital content. Digital content producers/providers face various challenges to control and distribute digital content, while keeping abreast with evolving business models to generate profit. Digital Rights Management ("DRM") involves management of digital rights including physical manifestation of digital content (for example, a textbook or an article). DRM techniques are used to control access to digital content by enforcing controlled environments and/or encoding digital content.

Various standards are being used and developed to control, monitor and capitalize on digital content distribution in the commercial world, especially involving mobile devices. The following describes some of these standards.

The Open Digital Rights Language (ODRL) is a standard DRM architecture (incorporated herein by reference in its entirety) for protecting digital content in an open or trusted computing environment. ODRL defines a standard vocabulary for expressing the terms and conditions over an asset (digital content). Rights can be specified for a specific asset manifestation or format or could be applied to a range of manifestations of the asset. ODRL does not enforce or mandate any policy for DRM, but provides mechanisms to express such a policy. ODRL does not presume that mechanisms exist to achieve a secure architecture, but complements existing rights management standards by providing digital equivalents and supports an expandable range of new services that can be afforded by the digital nature of the assets in the Web environment. In the physical environment, ODRL can enable machine-based processing for DRM. The information about ODRL, as well as, ODRL electronic resources such as the ODRL Specification (version 1.1), the ODRL Data Dictionary (version 1.1), and the ODRL Expression Language (version 1.1), are incorporated herein by reference in their entirety.

The eXtensible Markup Language (XML) (incorporated herein by reference in its entirety) is a standard for exchanging data and metadata electronically, where metadata describes the data. For example, the term "writer" is metadata that describes the data "CS Lewis". XML is an outgrowth of the Standard Generalized Markup Language (SGML) that allows the author of an XML document to separate the logical content of the document from the presentation of the content. An author of an XML document adds metadata to a document as hypertext transfer protocol (HTTP) tags in the document. A document type definition (DTD) file is the mechanism that adds shared content to the XML document.

The extensible rights Markup Language (XrML) (incorporated herein by reference in its entirety) is an XML conforming language definition that specifies rights, fees, and conditions for using digital content. XrML also describes message integrity and entity authentication rules. XrML supports commerce in digital content such as publishing and selling electronic books, digital movies, digital music, interactive games, and computer software.

The Open Mobile Alliance ("OMA"), a standard organization was created by consolidating the efforts of the supporters of the Open Mobile Architecture initiative and the WAP Forum with the SyncML initiative, Location Interoperability Forum (LIF), MMS Interoperability Group (MMS-IOP), Wireless Village, Mobile Gaming Interoperability Forum (MGIF), and Mobile Wireless Internet Forum (MFIW). The OMA provides an overall standard architecture (incorporated herein by reference in its entirety) that compliments existing communication standards, such as 3GPP or CDMA and also provides guidelines for controlling a mobile device, delivering and protecting content, and assists in commercial transactions using a mobile device. The term Mobile Commerce ("M-Commerce") as used throughout this specification means the exchange or buying and selling of services and goods including subscription services, both physical and digital, from a mobile device.

Conventional digital content transactions involve a mobile device user (or subscriber, used interchangeably throughout this specification) who places an order for content. The subscriber obtains the rights from a rights issuing authority and content from a digital content provider via a mobile network operator ("MNO"). The rights associated with the content determine how the user can use or share the content. For example, the rights granted by the rights issuing authority may allow the subscriber to share the content with others (or "peers") using a peer-peer network.

In a peer-to-peer network, the subscribers are connected to each other and mobile devices can exchange data/information. A peer-to-peer network allows content to be stored/shared among subscribers using a mobile network besides a phone-to-phone connection.

As digital content related transactions become more popular, digital content providers will need new innovative business techniques to increase revenue and profits. Conventional business models fail to capitalize or generate revenue based on content stored in a subscriber's mobile device. Once, content is downloaded by the subscriber, the content provider or the subscriber, does not generate any more revenue based on the downloaded content. Instead of utilizing the downloaded content for generating extra revenue, conventional techniques have tried to restrict content sharing in a peer-to-peer environment.

Therefore, there is a need for a method and system that will allow content stored by a subscriber to be re-circulated among other subscribers, hence, providing a new source of revenue for the parties that are involved in the transaction, namely, the content provider, the MNO, the rights issuing entity and the subscriber whose stored content is licensed/distributed to another subscriber.

SUMMARY OF THE INVENTION

In one aspect of the present invention, a method for conducting a transaction involving digital content is provided. The method includes, receiving a request for digital content from a first user's mobile device; searching if a second user's mobile device has the requested digital content; obtaining rights for re-distributing the requested digital content, if the second user's mobile device is connected to a network at an instance when the request for the digital content is received from the first user and has the requested digital content;

compensating the second user who has the requested digital content, for distributing content to the first user; and compensating a content provider and a MNO for distributing the requested digital content from the second user's mobile device to the first user's mobile device.

The MNO receives the request for digital content from the first user and conducts a search for the requested digital content.

The method also includes, obtaining the requested digital content and rights associated with the digital content from the digital content provider and a rights issuing authority, if the second user's mobile device and/or any other user's mobile device that is connected to the network does not have the requested digital content.

In another aspect of the present invention, a system for conducting a transaction involving digital content is provided. The system includes, a first user of a first mobile device connected to a network; a second user of a second mobile device connected to the network; a MNO that is functionally coupled to the first mobile device and the second mobile device and to a digital content provider and a rights issuing authority, wherein the MNO receives a request for digital content from the first user, searches for the requested digital content and if the second user has the requested digital content, then the MNO obtains any rights to access and re-distribute the requested digital content from the second user to the first user; and the second user, the digital content provider and the MNO are compensated for the distributing the requested digital content from the second mobile device to the first mobile device.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a system that allows re-distribution of digital content stored in a subscriber's mobile device will be described. The specific architecture and operation of the preferred embodiment will then be described with reference to the general architecture.

Figure 1A:
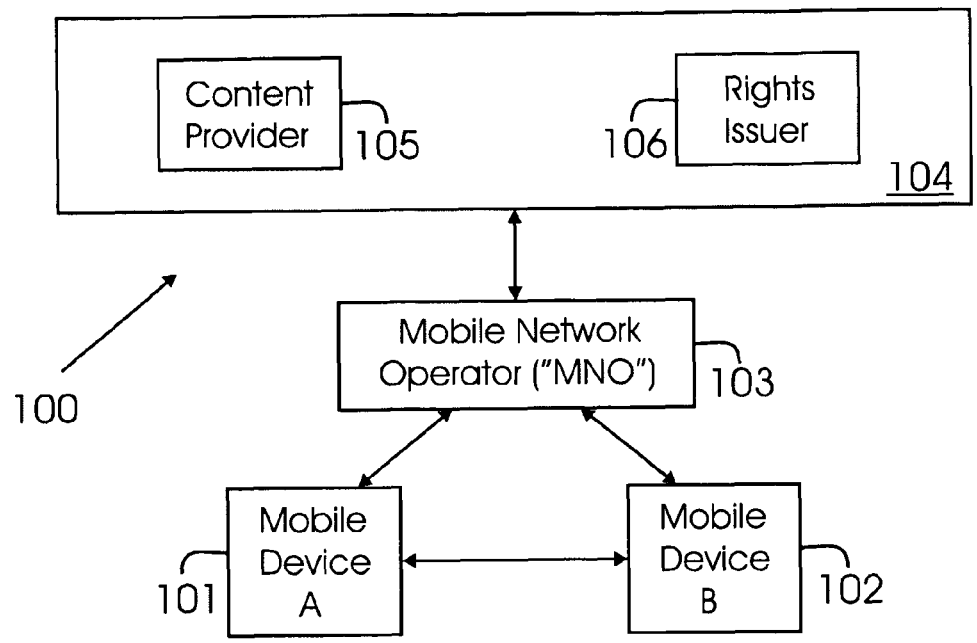
FIG. 1A shows a block diagram of a system for conducting transactions involving digital content, according to one aspect of the present invention.

Overall System:

FIG. 1A shows a block diagram of the overall system 100 that is used according to one aspect of the present invention. In FIG. 1A, a mobile device A 101 (also referred to as "device 101" or "mobile device 101" or as the "source mobile device") (used by a subscriber that may be referred to as "subscriber A" or "User A") and a mobile device B 102 (also referred to as "device 102" or "mobile device 102") (used by a subscriber that may be referred to as "subscriber B" or "User B") are operationally coupled to MNO 103. Mobile devices may connect to a content provider/server (105) via MNO 103 or any other type of network, for example, the Internet, Wi-Fi or the like.

MNO 103 receives requests from a subscriber and delivers digital content, as described below. MNO 103 is operationally coupled to system 104 that includes a digital content provider 105 (may also be referred to as module 105) and rights issuing authority 106 (may also be referred to as "module 106", "Rights Issuer 106", "RI" or "Rights Issuing Authority"). It is noteworthy that modules 105 and 106 may be functionally/physically separate or integrated in a single computing system.

User B sends a request to MNO 103 for certain digital content. MNO 103 searches for content based on the request and determines if another user (for example, User A) has the requested content. If User A is connected to the network at the time of User B's request and has the requested content, then MNO 103 obtains the essential rights for re-distributing the requested content to User B. MNO 103 may get the content from User A or send it directly to User B from content provider 105.

In one aspect of the present invention, User A is given a certain percentage of the license price/transaction cost. The content provider (i.e. the entity hosting module 105) and MNO 103 also get a certain percentage of the license price.

Figure 1B:
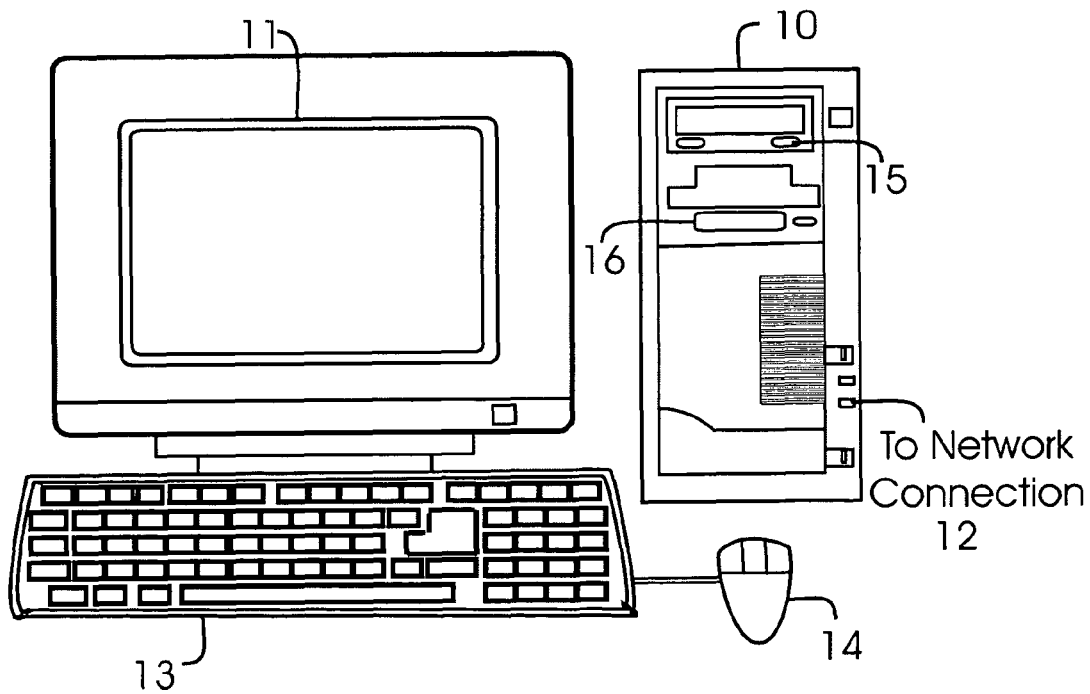
FIG. 1B shows a block diagram of a computing system used in the system of FIG. 1A, according to one aspect of the present invention.
Figure 1C:
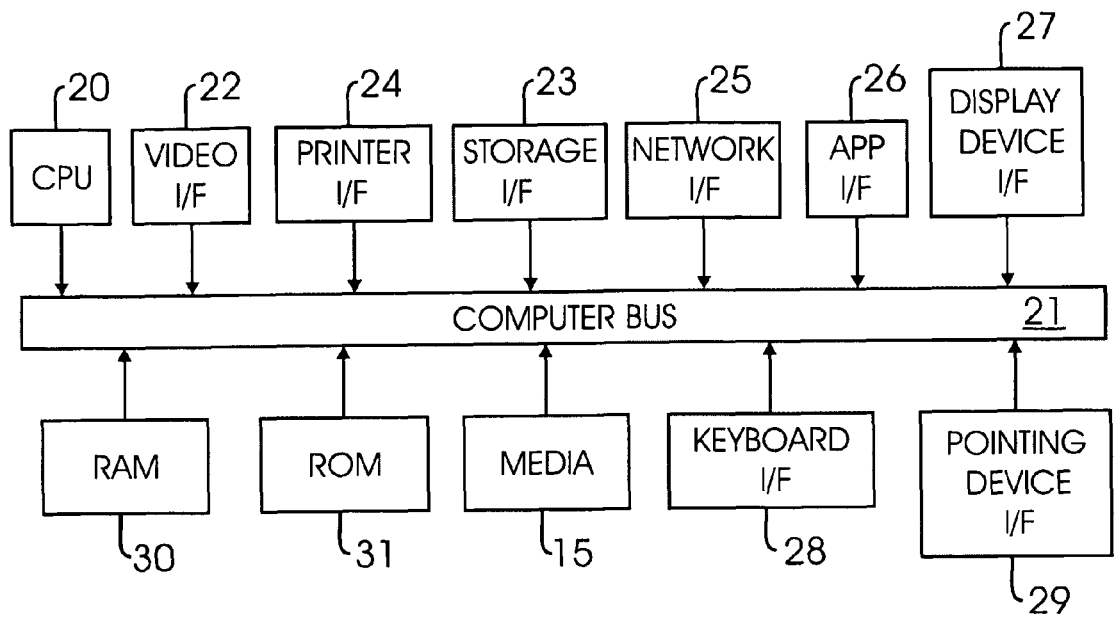
FIG. 1C shows the internal architecture of the computing system of FIG. 1B.

The adaptive aspects of the present invention are not limited to the topology of FIG. 1A. Various modifications may be used, for example, as shown in FIGS. 1D and 1E, described below.

Figure 1D:
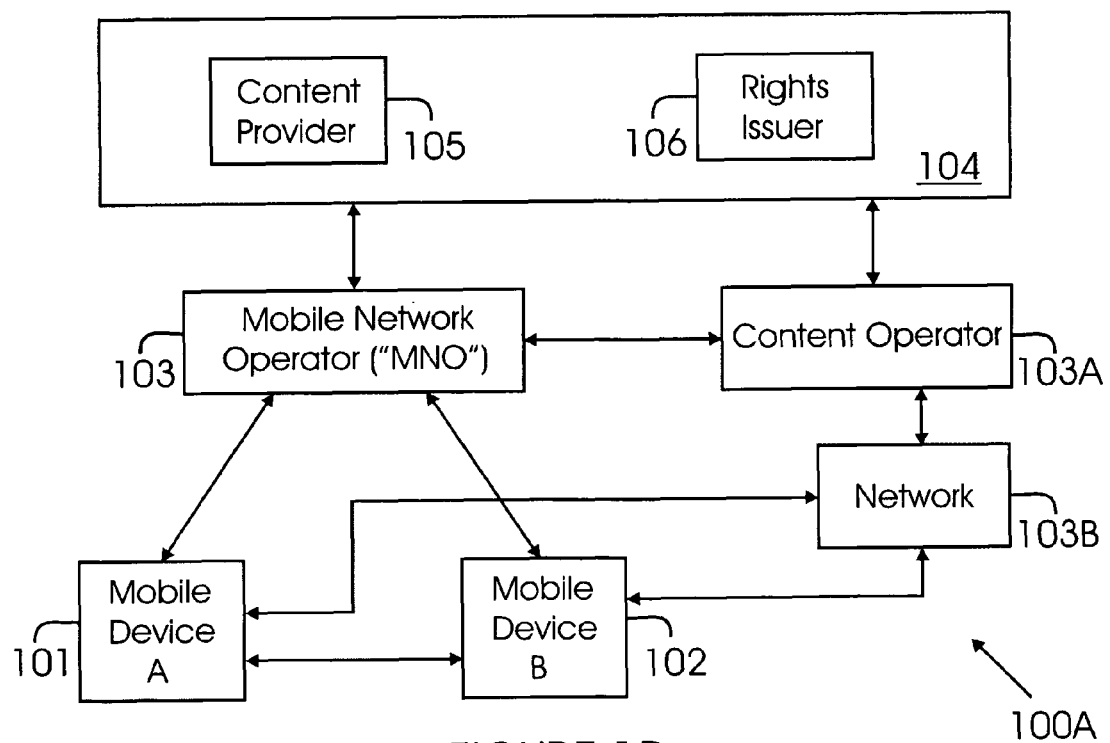
FIG. 1D shows a block diagram of a system for conducting transactions for digital content, according to one aspect of the present invention.
Figure 1E:
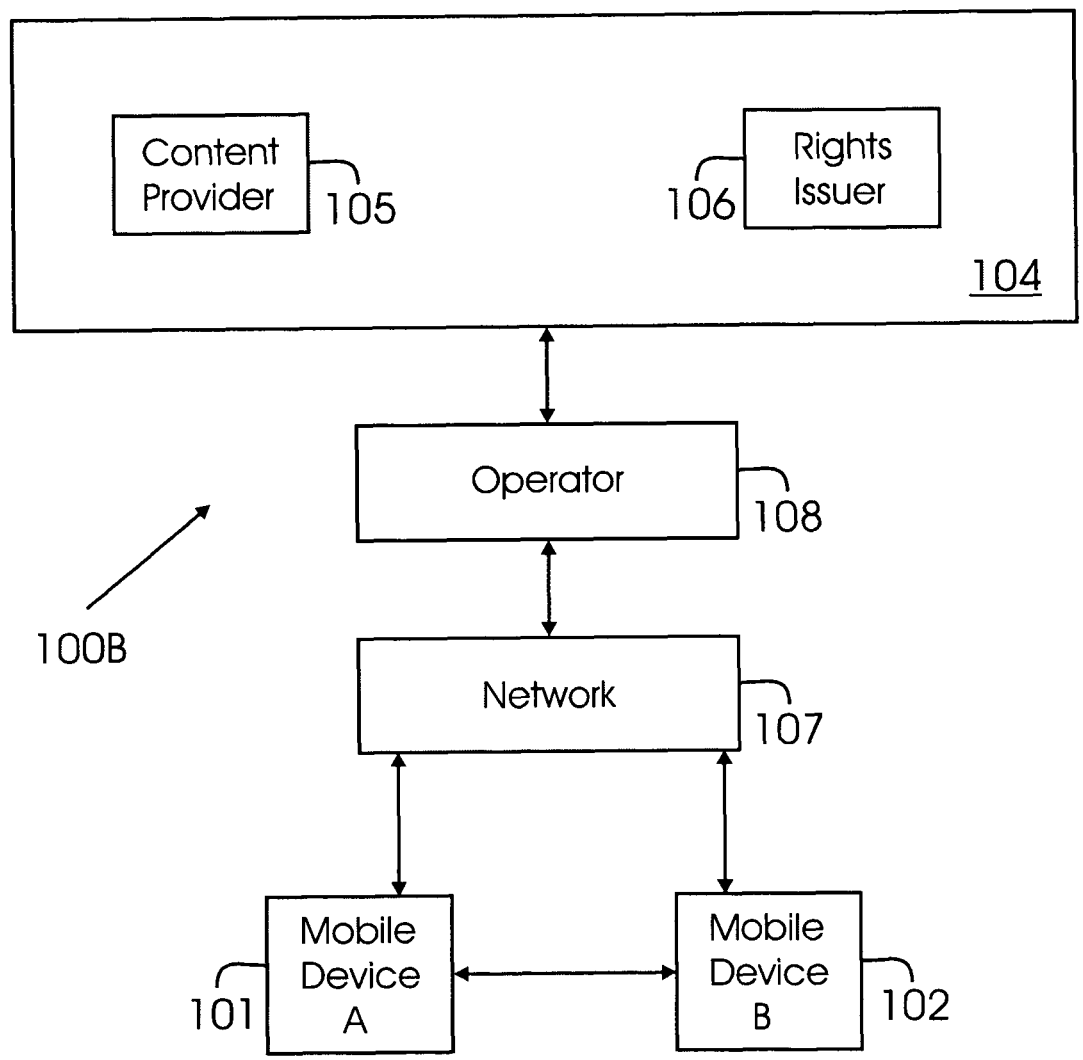
FIG. 1E shows another example of a system for conducting transactions involving digital content, according to one aspect of the present invention.

FIG. 1D shows system 100A with a content operator 103A that co-ordinates digital data exchange between plural subscribers. Content operator 103A may charge each subscriber a fee to participate in a "content exchange program", which allows each subscriber to license/re-distribute content that is stored locally on a subscriber's mobile device or to which a subscriber has access.

Subscribers (for example, User A and User B) directly interface with content operator 103A via a network 103B. In this configuration, content operator 103A may interface with module 106 to obtain the rights package for digital content and content may be delivered via MNO 103 or network 103B.

In another aspect of the present invention, subscribers may choose to go through MNO 103 that interfaces with content operator 103A. Also, subscribers (User A and User B) may directly exchange digital content using network 103B and content operator 103A.

FIG. 1E shows another example of a topology (100B), where mobile devices 101 and 102 may exchange digital content via a network 107. An operator 108 facilitates the transactions between the subscribers, and MNO 103 may not be required. In system 100B, network 107 may be any proprietary or public network that couples devices 101 and 102 to operator 108 that is coupled to system 104.

Computing System:

Typically, modules 105/106 are a computing system where digital content is stored. FIG. 1B shows a block diagram of a computing system (may also be referred to as "computer") that may be used by modules 105/106 (and MNO 103), according to one aspect of the present invention. FIG. 1B includes a computer 10 and a monitor 11. Monitor 11 may be a CRT type, a LCD type, or any other type of color or monochrome display. Also provided with computer 10 are a keyboard 13 for entering text data and user commands, and a pointing device 14 for processing objects displayed on monitor 11.

Computer 10 includes a computer-readable memory medium 15 such as a rotating disk/tape for storing readable data/digital content. Besides other programs, media 15 can store application programs, digital content, security algorithms and any other interface used for implementing the adaptive aspects of the present invention.

Computer 10 can also access another computer-readable media 16 (for example, a floppy disk, CD-ROM, flash memory or any other media) storing data files, application program files, and computer executable process steps embodying the present invention. A CD-ROM/CD-Read-Write interface (not shown) may also be provided with computer 10 to access application program files, and data files stored on a CD.

A modem, an integrated services digital network (ISDN) connection, Wi-Fi or the like also provides computer 10 with a network connection 12. In one aspect, the network connection 12 allows computer 10 to access the World Wide Web (WWW) via the Internet. Network connection 12 allows computer 10 to download data files, application program files and computer-executable process steps.

FIG. 1C is a block diagram showing the internal functional architecture of computer 10. As shown in FIG. 1C, computer 10 includes a CPU 20 for executing computer-executable process steps and also interfaces with a computer bus 21. Also shown in FIG. 1C are a video interface 22, a printer interface 24, a storage device interface 23, a Network interface 25, an application interface 26, a display device interface 27, a keyboard interface 28, and a pointing device interface 29.

Application interface 26 may be used to interface with security algorithms/hardware for securing digital content. Storage interface 23 may be used for interfacing computer 10 with mass storage area networks (not shown). The network interface 25 allows computer 10 to connect to a network via network connection 12.

As described above, media 15 stores operating system program files, application program files, web browsers, and other files. Some of these files are stored on media 15 using an installation program. For example, CPU 20 executes computer-executable process steps of an installation program so that CPU 20 can properly execute the application program.

A random access main memory ("RAM") 30 also interfaces to computer bus 21 to provide CPU 20 with access to memory storage. When executing stored computer-executable process steps from media 15 (or other storage media 16 or via network connection 12), CPU 20 stores and executes the process steps out of RAM 30.

Read only memory ("ROM") 31 is provided to store invariant instruction sequences such as start-up instruction sequences or basic input/output operating system (BIOS) sequences.

The foregoing description of computer 10 is intended to provide a general description of a computing system that may be used in system 100. Various modifications may be used to implement the adaptive aspects of the present invention. Other configurations may be used and may have additional or fewer components than those described above with respect to FIG. 1B/1C. For example, a server (used by modules 105/106) may not use a keyboard or a display device and may be administered remotely by another computing system.

Mobile Device

Figure 2A:
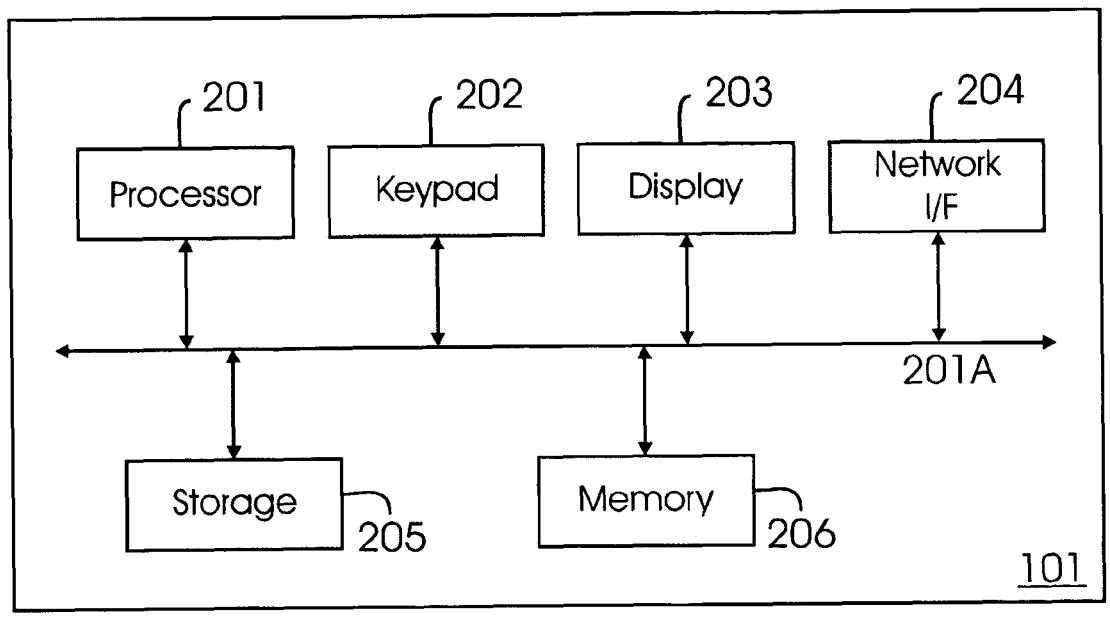
FIG. 2A shows a block diagram of a mobile device used in the system of FIG. 1A.

FIG. 2A shows a block diagram of a mobile device (for example 101) that is used according to one aspect of the present invention. Mobile device 101 is a general purpose wireless device, which includes cellular phones and PDAs. Mobile device 101 includes a local bus 201A that connects various other components, including keypad 202, display module 203, network interface 204, and processor 201. A data storage device 205 may also be provided and may include flash memory cards and/or other memory devices.

There are currently many different flash memory cards that are commercially available, examples being the Compact-Flash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. Network interface 204 allows connectivity between mobile device 101 and any network.

Processor 201 performs the methods of the disclosed invention by executing sequences of operational instructions resident in memory 206.

Figure 2B:
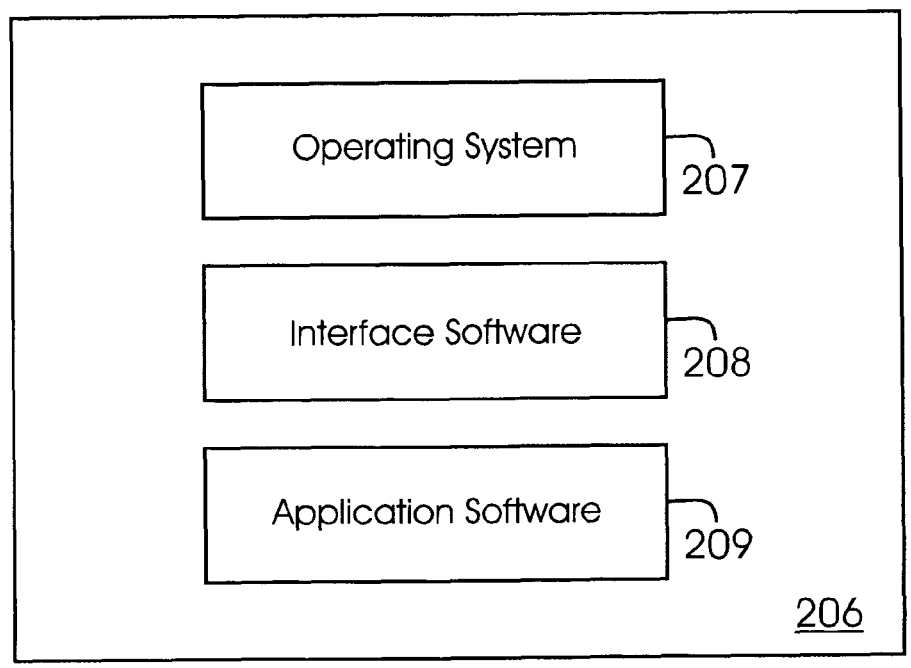
FIG. 2B shows a block diagram of a memory used in the mobile device of FIG. 2A.

As shown in FIG. 2B, memory 206 includes an operating system 207, interface software 208 and application software 209. Operating system 207 includes embedded software and low-level system software that controls mobile device 101 and communication with other components, for example, keypad 202 and display 203.

Application software 209 includes a user interface (not shown) that allows a user to conduct digital content related transactions including requesting digital content from MNO 103, according to one aspect of the present invention. Application software 209 and interface software 208 include security modules that allow a user to safely conduct digital content related transactions.

Application software 209 allows a user to use the Internet to conduct transactions and computer-executable process steps, according to one aspect of the present invention.

The following provides a brief description of the Internet. It is noteworthy that the Internet is just one way to deliver content, according to the adaptive aspects of the present invention, and is not intended to limit the present invention. Any other network, including proprietary networks used by MNOs, TCP/IP, PABX or the like may be used to conduct the commercial transactions, according to the adaptive aspects of the present invention.

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language as published by W3C Consortium, Version 1, Second Edition, October 2000, ©W3C may also be used. The collection of all such publicly available computer files is known as the World Wide Web (WWW).

The WWW is a multimedia-enabled hypertext system used for navigating the Internet and is made up of hundreds of thousands of web pages with images, text and video files, which can be displayed on a computer monitor/mobile device 111. Each web page can have connections to other pages, which may be located on any computing device connected to the Internet.

A typical Internet user uses a client program called a "Web Browser" to connect to the Internet. A user can connect to the Internet via a proprietary network or via an Internet Service Provider. A Web Browser may run on any computing device connected to the Internet. Currently, various browsers are available of which two prominent browsers are Netscape Navigators and Microsoft Internet Explorer®.

The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Figure 3:
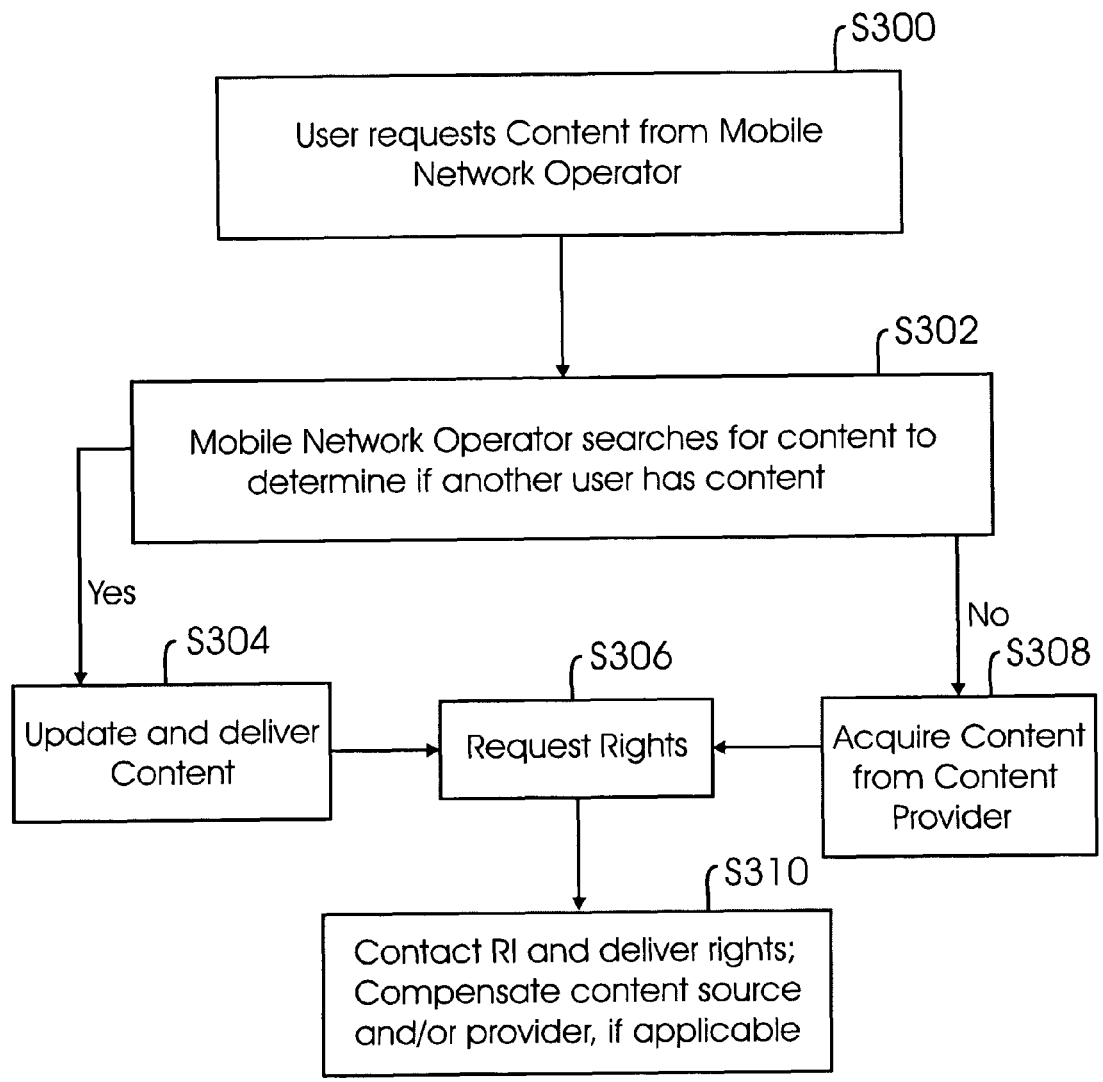
FIG. 3 shows a process flow diagram of conducting a transaction involving digital content, according to one aspect of the present invention.

Process Flow:

FIG. 3 shows a process flow diagram for conducting digital content delivery transactions, according to one aspect of the present invention. In step S300, a subscriber (for example, User B of mobile device 102) sends a request for digital content to MNO 103. User B may use Application Software 209 to send the request. In another aspect of the present invention, requests may be sent to content operator 103A (FIG. 1D) or operator 108 (FIG. 1E).

In step S302, MNO 103 searches for content. MNO 103 determines if the requested content is available from another user (for example, User A using mobile device 101). If another user (for example, User A) has the requested content, then in step S304, MNO 103 acquires content from mobile device 101 (or module 105) and updates the content package, as described below with respect to FIG. 4, after determining that the content can be sourced/redistributed from the mobile device (101).

It is noteworthy that MNO 103 may deliver content from module 105 instead of mobile device 101 due to bandwidth restrictions and for improving the content downloading rate. In this case MNO 103 traces the content or updates the URL to the rights package, as discussed below in detail with respect to FIG. 4.

In step S306, a request for the rights package associated with the requested content is sent to module 106 and the process moves to step S310.

In step S310, MNO 103 delivers the rights package that is received from module 106 to User B. This allows User B to use the digital content received in step S304. User A is compensated for the content that is licensed and sent to User B. MNO 103 and content provider 105 also get a percentage of the transaction.

If another connected subscriber (for example, User A) does not have content in step S302, then in step S308, MNO 103 acquires the content from content provider 105 and delivers it to User B and the process moves to step S306. Also, in this aspect, in step S310, only the content provider 105, RI 106 and MNO 103 are compensated for the transaction.

Figure 4:
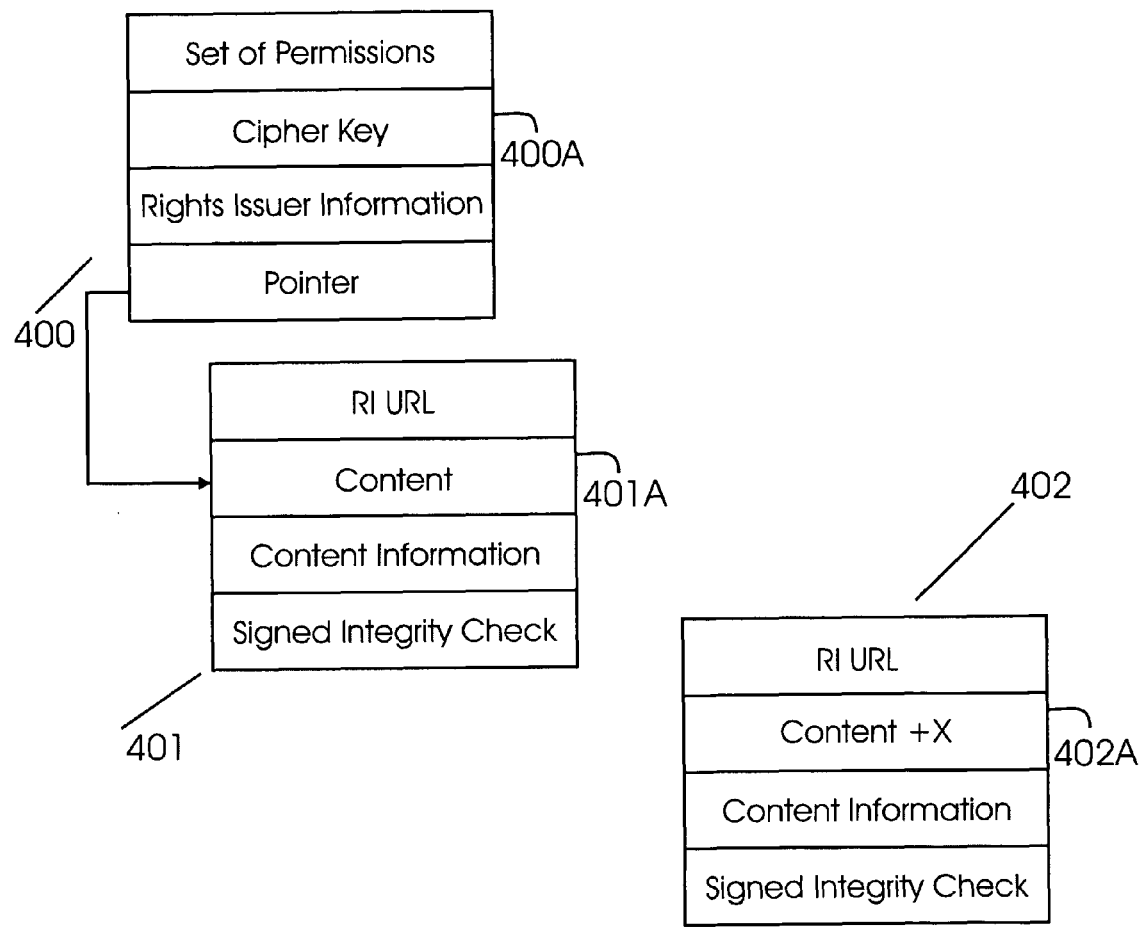
FIG. 4 is a block diagram showing a right package (or oblect) manipulation, according to one aspect of the present invention.

FIG. 4 shows a block diagram of a rights package ("RP") 400, protected digital content package ("PDCP") 401 and the modified PDCP 402 that is used, according to one aspect of the present invention. RP 400 is issued by module 106 and includes a set a permissions that are associated with specific content. RP 400 also includes a cipher key 400A that is used for deciphering the digital content. RP 400 further includes a pointer that points to protected digital content 401A. It is noteworthy that the present invention is not limited to any particular cipher key/algorithm/methodology. RP 400 also includes information regarding the entity that issues the rights (rights issuer information).

PDCP 401 includes a URL for module 106. It also includes content and information that describes (or related) the digital content. Optionally, PDCP 401 may also include information that shows an integrity check for the content has been completed. This allows content to be signed or unsigned, depending on whether the integrity check is included in PDCP 401.

In Modified PDCP 402, the protected content (shown as 402A) includes a pointer (shown as "X") that points to the rights issuer and provides information about the source of the protected digital content (for example, mobile device 101). RI URL' is concatenated with a pointer to the content source (for example, mobile device 101) and the original RP 400 is not changed.

A new cipher key may be stored and used to access the stored content from User A. The new cipher key may be kept with mobile device 101. The original cipher key (from module 106) and the new cipher key (from mobile device 101) may be used by User B to decipher/access content.

Figure 5:
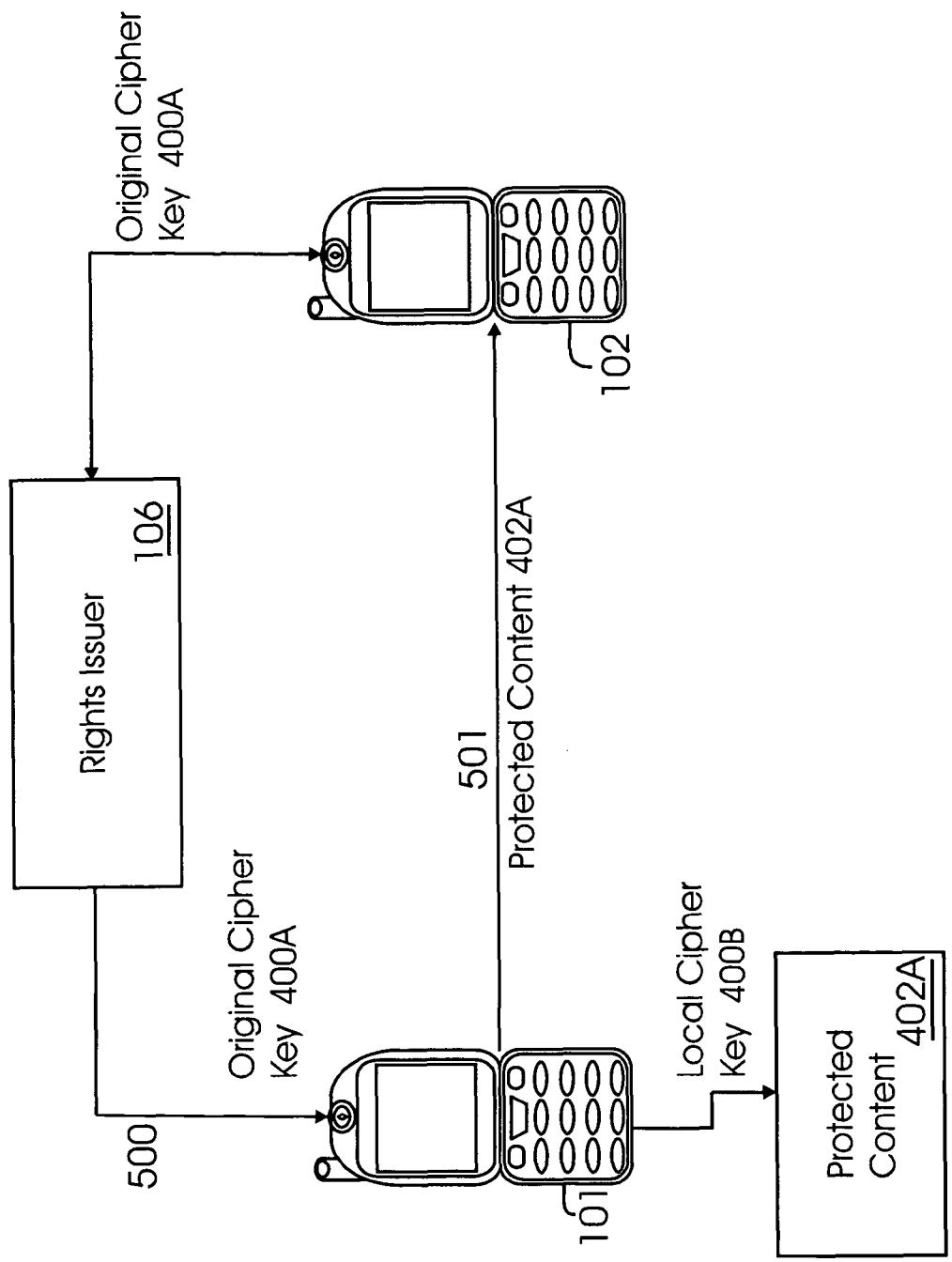
FIG. 5 shows an example of how cipher keys are distributed, according to one aspect of the present invention.

FIG. 5 shows an example of how cipher keys may be used to access protected content by mobile device 102. Module 106 sends original content cipher key 400A to mobile device 101 (shown as 500). A local cipher key 400B is generated by mobile device 101 and can be used to protect content 402A.

When content (402A) is transferred from mobile device 101 to mobile device 102 (shown as 501), then the content can be protected by the original cipher key 400A or by using local cipher key 400B. If only the original cipher key 400A is used then mobile device 102 obtains the original cipher key from module 106 to decipher the protected content.

If the original cipher key 400A is not used, then mobile device 192 uses the local handset cipher key 400B is used to access content.

The adaptive aspects of present invention are not limited to the foregoing topologies/process steps, various modifications/options may be used so that a subscriber that has content and is connected to a network at a given instance benefits from a transaction. The following provides a few examples of the various modifications:

Protected digital content may be marked and redistributed; or marked, signed (with an integrity check) and distributed.

A user mobile device (for example, 101) may become the rights issuing authority 106 after it updates a cipher key that is related to protected digital content. In this situation, module 106 is compensated when the request for the rights is made, and MNO 103 may compensate module 106.

A local cipher key (400B) and the original cipher key 400A are used to secure access to content. In this case, MNO 103 may obtain the rights from module 106 and an updated cipher key from mobile device 101. MNO 103 then delivers an updated rights package. In another aspect, MNO 103 acquires the rights from module 106 and key from mobile device 101, and then creates a rights package. This rights package is sent to mobile device 102.

In another aspect of the present invention, a database for module 106 is updated with a new reference (i.e. the rights package and the new source (mobile device 101). However, the new rights package may have an expiration date. Even when the new rights package expires, the original cipher key/rights package is maintained and stored by module 106. In this aspect of the present invention, rights are renewed without interfacing with mobile device 101 (the original mobile device). Mobile device 101 may deliver empty rights (i.e. without a cipher key) and the original cipher key (400A) is used to access the content. The newly delivered rights are then updated and stored again.

In yet another aspect, different parts of the PDCP 401 are received from plural subscribers and the subscribers are compensated accordingly.

In one aspect of the present invention, User A benefits from storing the content in mobile device A 101 and by being connected to the network, at the instance User B sends a request for content.

Content provider 105 also benefits from this model, because more subscribers like User A will license and store digital content hoping that while they are connected, a request for the stored content will originate and they will benefit from the transaction described above. MNO 103 gets a percentage of the transaction as well. Furthermore, module 106 gets additional revenue based on additional requests for rights package to access/decipher digital content.

Therefore, this is a "win-win" revenue sharing model where all the parties involved in digital content stored in a subscriber's mobile device benefit.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method of receiving digital content, the method comprising:
   sending from a first mobile device to an operator over its wireless communications network a request for digital content, wherein the request initiates the operator to acquire the digital content from a second mobile device over the wireless communications network;
   receiving at the first mobile device a message from the operator, the message including first pointer that points to the digital content from the second mobile device;
   receiving at the first mobile device a modified protected digital content package, wherein the modified protected digital content package includes:
      a uniform resource locator (URL) of a rights issuer concatenated with a pointer that points to a source of the digital content that is distinct from the rights issuer;
      encrypted content that includes modified digital content, wherein the modified digital content includes the digital content modified to include a second pointer that points to rights issuance information associated with the digital content and to include information about the source of the digital content; and
      information that shows an integrity check for the encrypted modified digital content has been completed; and
   applying the rights issuance information to enable use of the digital content.

2. The method of claim 1, wherein a user of the second mobile device is compensated for providing the digital content to the first mobile device via the operator.

3. The method of claim 1, wherein the operator is compensated for distributing the digital content to the first mobile device.

4. The method of claim 1, wherein the second pointer points to a rights package associated with the digital content.

5. The method of claim 4, wherein the rights package includes a cipher key associated with the digital content.

6. The method of claim 4, wherein the rights package includes permissions associated with the digital content.

7. The method of claim 4, wherein the rights package includes a local key generated by the second mobile device.

8. An apparatus comprising:
   a first mobile device including a data storage device for storing digital content for the first mobile device,
   wherein the first mobile device is configured to:
      send a request for the digital content to an operator over a wireless communications network, wherein the request is to initiate the operator to acquire the digital content from a second mobile device over the wireless communications network;
      receive a message from the operator, the message including a first pointer that points to the digital content from the second mobile device;
      receive a modified protected digital content package, wherein the modified protected digital content package includes:
         a uniform resource locator (URL) of a rights issuer concatenated with a pointer that points to a source of the digital content that is distinct from the rights issuer;
         encrypted content that includes modified digital content, wherein the modified digital content includes the digital content modified to include a second pointer that points to rights issuance information associated with the digital content and to include information about the source of the digital content; and
         information that shows an integrity check for the encrypted modified digital content has been completed; and
      apply the rights issuance information to enable use of the digital content.

9. The apparatus of claim 8, wherein the second pointer points to a rights package associated with the digital content.

10. The apparatus of claim 9, wherein the rights package includes permissions associated with the digital content.

11. The apparatus of claim 9, wherein the rights package includes a cipher key associated with the digital content.

12. The apparatus of claim 9, wherein the rights package includes a local key generated by the second mobile device.

* * * * *

UNITED STATES PATENT AND TRADEMARK OFFICE
CERTIFICATE OF CORRECTION

PATENT NO. : 8,429,755 B2
APPLICATION NO. : 11/137916
DATED : April 23, 2013
INVENTOR(S) : Fabrice Jogand-Coulomb et al.

It is certified that error appears in the above-identified patent and that said Letters Patent is hereby corrected as shown below:

In the Claims:

Column 9, Claim 1, Line 54, "operator, the message including first pointer that points" should read --operator, the message including a first pointer that points--.

Signed and Sealed this
Eighteenth Day of June, 2013

Teresa Stanek Rea
*Acting Director of the United States Patent and Trademark Office*